No. 785,982. PATENTED MAR. 28, 1905.
C. A. SMITH.
TABLE ADJUSTER.
APPLICATION FILED FEB. 4, 1904.

Witnesses:
H. P. Hallock
L. A. Morrison

Inventor:
Charles A. Smith,
By
Atty

No. 785,982. Patented March 28, 1905.

UNITED STATES PATENT OFFICE.

CHARLES A. SMITH, OF PHILADELPHIA, PENNSYLVANIA.

TABLE-ADJUSTER.

SPECIFICATION forming part of Letters Patent No. 785,982, dated March 28, 1905.

Application filed February 4, 1904. Serial No. 192,054.

*To all whom it may concern:*

Be it known that I, CHARLES A. SMITH, a citizen of the United States, residing at Philadelphia, county of Philadelphia, and State of Pennsylvania, have invented a certain new and useful Improvement in Table-Adjusters, of which the following is a specification.

My invention relates to a new and useful improvement in table-adjusters, and has for its object to provide an adjusting arrangement located in the lower end of each table-leg for the purpose of leveling tables, this invention being particularly adaptable for billiard-tables and the like.

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1:
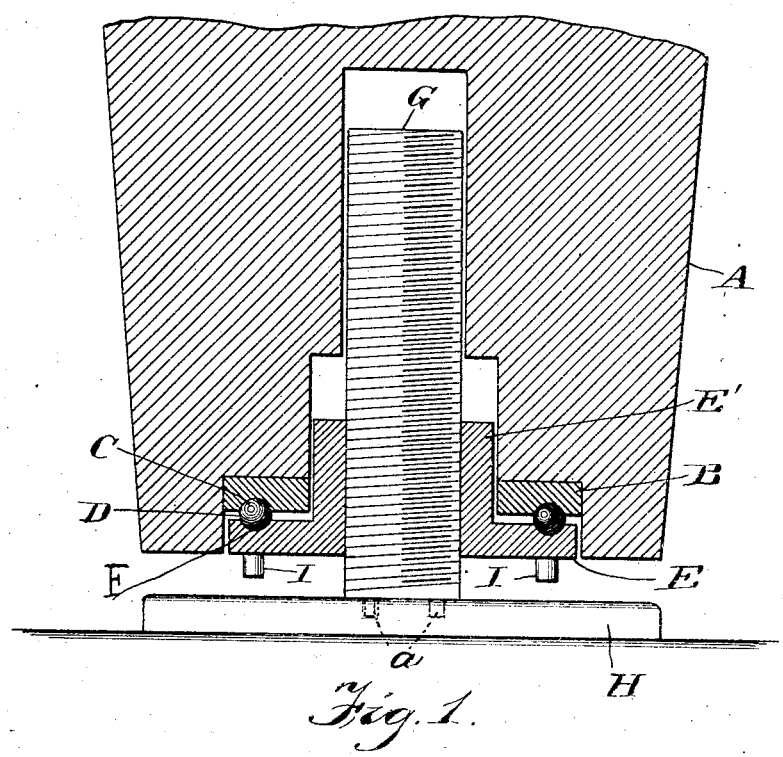
Figure 2:
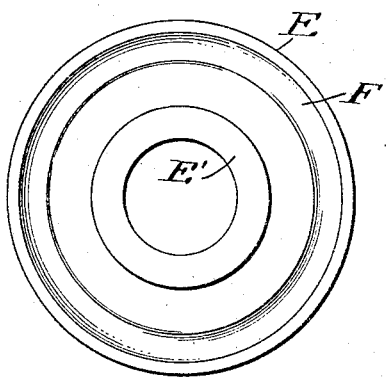
Figure 3:
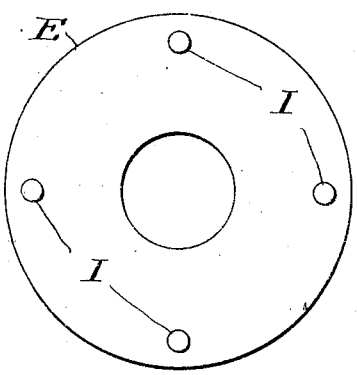

Figure 1 is a vertical section through the lower end of a table-leg, showing my improvement applied thereto; Fig. 2, a plan view of the lower half of the bearing, which is interiorly threaded to receive the adjusting-bolt; Fig. 3, a bottom plan view of the lower half of the bearing.

A represents the table-leg, which is bored out at the lower end to form a stepped recess adapted to receive the adjuster.

The adjuster consists of an upper bearing-ring B, embedded in the lower end of the recess in the leg and secured tightly in place. In the lower face of this lower bearing-ring B is formed an annular groove C, adapted to form the upper bearing-surface for balls D, which are arranged within a circle.

E is the lower bearing-ring, upon the upper face of which is formed an annular groove F, which is directly opposite to the groove C and forms the lower bearing-surface for the balls D. Arising from the center of the bearing-ring E is a boss E', which is interiorly threaded and extends partly within the next section of the stepped recess.

G is an exteriorly-threaded bolt or stud which is threaded through the bearing E, and the lower end of the bolt or stud projects below the bearing E and rests upon the plate H, which plate is in contact with the floor. The opposite end of the bolt extends loosely into the upper portion of the stepped recess.

When all the parts are in their normal position, the lower surface of the bearing E is flush with the lower end of the table-leg A. Projecting downward from the bearing E are a number of studs I, which are arranged near the periphery of the bearing E, and when it is desired to adjust the table it is only necessary to place a rod in between the lower end of the leg and the plate H so that the end of the rod bears against the stud or bolt G, and then, the rod coming in contact with one of the studs I, by pulling upon the rod against the stud the bearing E can be turned upon the threaded rod or stud G, so that said stud G will be forced upward into the leg or will be drawn farther out of the same to raise or lower the table. The weight of the table being upon the stud G and the stud G resting upon the plate will cause a sufficient amount of friction between the stud and the plate to prevent said stud G from turning with the bearing E, or, if necessary, the lower end of the stud G can be provided with projections *a* extending into recesses in the plate H.

By providing a ball-bearing adjuster the nut or bearing E can be more easily turned, and another advantage is that the bearing E will not revolve upon the stud G by vibration or movement of the table, for in any twisting movement of the leg the upper bearing-ring B will simply move upon the balls without communicating any movement to the bearing E, and as the adjuster is entirely embedded in the lower end of the leg the leg need not be raised but a small fraction of an inch from the floor.

The plate H can be made much thicker than that shown in the drawings, if desired, and the studs I need not be as long, so that, if necessary, the lower end of the leg could be brought within a quarter of an inch of the floor. Therefore it would not be necessary to saw off the end of the legs to apply the adjuster, as would be necessary with some other forms.

Of course I do not wish to be limited to the exact construction here shown, as slight modifications could be made without departing from the spirit of my invention.

Having thus fully described my invention, what I claim as new and useful is—

In combination with a table-leg having a stepped recess in its lower end, a plate having recesses, a threaded bolt resting on the plate and extending loosely into the upper portion of the stepped recess, lugs on the bottom of the bolt engaging the recesses of the plate, whereby said bolt is held against rotary movement, an upper bearing-ring tightly secured within the lower portion of the stepped recess and having an annular groove in its under face, a lower bearing-ring threaded on the bolt having an annular groove in its upper face coinciding with the groove in the upper ring and forming therewith a raceway, and having a boss extending upwardly from the center of the lower ring within the next section of the stepped recess, said boss being threaded to engage the bolt, balls in the raceway, and studs projecting downwardly from and at right angles to the under surface of the lower ring.

In testimony whereof I have hereunto affixed my signature in the presence of two subscribing witnesses.

CHARLES A. SMITH.

Witnesses:
MARY E. HAMER,
L. W. MORRISON.